Sept. 21, 1965   W. R. STEWART   3,207,234
PRESS WHEEL TIRE WITH CRUST FRACTURE BARS
Filed Oct. 22, 1962

INVENTOR.
Wayne R. Stewart
BY
Hovey, Schmidt, Johnson & Hovey
ATTORNEYS.

United States Patent Office 3,207,234
Patented Sept. 21, 1965

3,207,234
PRESS WHEEL TIRE WITH CRUST
FRACTURE BARS
Wayne R. Stewart, 404 W. 20th St., Hutchinson, Kans.
Filed Oct. 22, 1962, Ser. No. 231,904
5 Claims. (Cl. 172—519)

This invention relates to seed planting machines, and more particularly, to a tire for the press wheel of such a machine for forming depressions in the soil after the seed has been planted.

For many years, press wheels of the type having a pair of beveled rims mounted for rotation on a central hub have been used and furnished as original equipment on virtually every kind of seeding machine employed in row-crop operation. Such wheels have been found satisfactory in many cases, but the same are disadvantageous in that the construction thereof permits moist soil to "ball up" on the rims and cause the space between the rims to become clogged. Upon drying, the soil on the rims becomes very difficult to remove and wheel scrapers have, as a result, been employed, although unsuccessfully.

Sometime later, a semi-pneumatic tire was provided for such a press wheel, the purpose of the tire being to flex as the wheel rolled over the ground thus assuring that moist soil would be broken up and removed from the peripheral surface of the tire. Although such a tire has proven highly satisfactory under many soil conditions, the same has a disadvantage in that the entire region over which the tire passes is pressed or matted down, whereas in the case of the press wheel without the tire, the open center of the press wheel left an unpressed surface in the center of the row directly above the seeds within the soil. It has been found that if the entire region above the seed is pressed down, such as by a tire of the aforesaid character, the result is that the soil tends to crust over, depending upon the type of soil and degree of moisture and sunshine to which the soil is exposed. The crust so formed renders the emergence of the plants created by the germination of the seeds difficult, if not impossible.

The present invention is directed to structure which utilizes the advantages of a semi-pneumatic tire for a press wheel, while at the same time, provides means for forming areas of weakness in the soil to facilitate the emergence from the soil of the crop formed upon germination of the seeds.

It is, therefore, the primary object of the present invention to provide a flexible, ground-engaging body for the press wheel of a seed plating machine wherein the body is provided with means thereon extending outwardly from the peripheral surface thereof for penetrating the soil to a predetermined depth, whereby the soil packed by the body will be provided with areas of weakness due to the presence of the penetrating means to thereby facilitate the emergence of crop or plants formed from the seeds planted by the machine.

A further object of the present invention is the provision of a semi-pneumatic tire having a series of spaced, circumferentially disposed lugs integral herewith at the periphery thereof, whereby depressions are formed in the ground above the seed to create areas of weakness at the junctions of the depressions and the packed surface adjacent thereto. Thus, the soil at said areas will give way as the crop moves upwardly upon normal growth thereof.

Still another object of the present invention is the provision of a semi-pneumatic tire having projections on the peripheral surface thereof for forming depressions in the soil above the seed planted therebelow, whereby the depressions form pockets for receiving water during normal rainfall to thereby reduce the tendency of the soil to erode under the influence of the water thereon.

A further object of the present invention is the provision of a tire of the type described which is provided with lugs thereon integral therewith at the periphery thereof, whereby the lugs provide traction for the tire and thereby the press wheel on which the latter is mounted to thereby augment force required to move the press wheel and while at the same time assure that equipment, such as seed and fertilizer boxes actuated by the rotation of the press wheel, will be continuously operated during forward movement of the press wheel.

Other objects of the present invention will become apparent as the following specification progresses, reference being had to the accompanying drawing, wherein.

Figure 1:
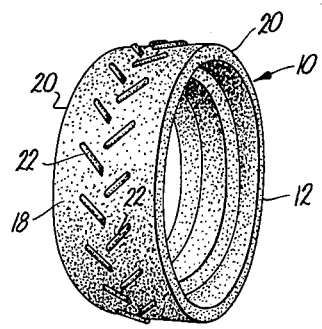
FIGURE 1 is a perspective view of one embodiment of the tire which forms the subject of the present invention and illustrating the lugs thereon at the peripheral surface thereof for forming depressions in the soil as the tire passes thereover in one direction.

The present invention provides a tire adapted to be mounted on the press wheel of a conventional seed planting machine, and wherein the tire is provided with a series of outwardly extending, circumferentially spaced lugs thereon at the periphery thereof. The lugs are disposed for penetrating the soil as the tire passes thereover under the influence of the press wheel so that depressions will be formed in the soil above the seed which has previously been planted in the soil by the machine on which the press wheel is mounted. Thus, areas of weakness above the seeds will be formed to facilitate the emergence of the crop created by the germination of the seed, and furthermore, the depressions will serve as pockets for receiving water during normal rain fall to thereby reduce the tendency of the soil to erode.

The lugs on the tire are further disposed for providing additional traction for the tire and thereby, the press wheel on certain planting machines wherein the press wheel is directly coupled to the drive means of such a machine.

One embodiment of the tire which forms the subject of the present invention is illustrated in FIGS. 1–5 and broadly denoted by the numeral 10. Tire 10 includes a tubular body 12 formed from a resilient material and adapted to be mounted on a conventional press wheel of the type illustrated in FIG. 7 having a pair of spaced, beveled rims 14 secured to a hub (not shown) by means of a number of spokes 16 rigid to and spaced about the inner surfaces of rims 14 as is clear in FIG. 7.

Tire 10 is preferably of the zero pressure type wherein the same has a hollow, one-piece body provided with spaced, inwardly directed breather openings which permit air to enter and fill the body at atmospheric pressure. As tire 10 rolls over the ground, the ground-engaging portion flattens but immediately resumes its initial shape after moving upwardly. Such deformation of the tire maintains the same substantially free of soil thereon as the moist, sticky soil yields to the constant flexing action of tire 10. Such flexing action further creates heat which effectively dries the moist, sticky soil causing the latter to crumble and fall off tire 10.

Figure 2:
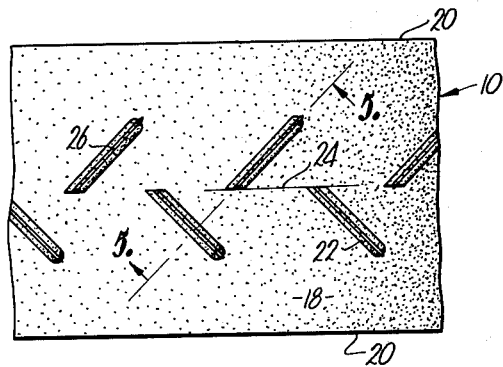
FIG. 2 is an enlarged, fragmentary view of the peripheral surface of the tire showing the relative positions of the lugs thereon.
Figure 3:
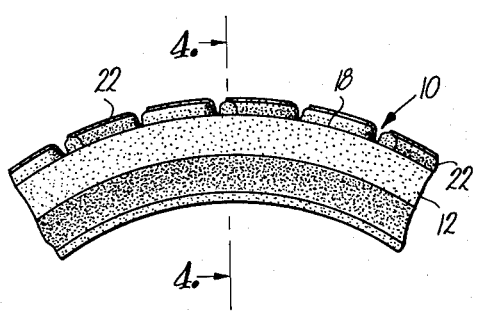
FIG. 3 is a fragmentary, side view of the tire showing the lugs projecting radially outwardly from the surface thereof.
Figure 4:
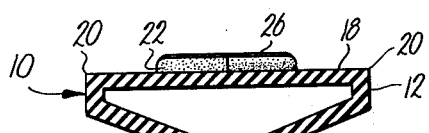
FIG. 4 is a cross-sectional view taken along line 4—4 of FIG. 3.

Body 12 of tire 10 is provided with a substantially flat, outermost peripheral surface 18 defined by a pair of spaced, circumferentially extending edges 20, as is clear in FIGS. 1, 2 and 4.

Means is provided on surfaces 18 for forming depressions in the soil as tire 10 passes thereover, and includes a series of circumferentially disposed, elongated lugs or bars 22 integral with the material forming body 12. As is clear in FIG. 3, lugs 22 project radially outwardly from surface 18 and the longitudinal axes thereof extend substantially parallel with surface 18.

Proximal ends of adjacent lugs 22 are substantially transversely aligned as is clear in FIG. 2, and furthermore, the end of each lug 22 remote from the corresponding edge 20, lies substantially on a line 24 midway between edges 20 and extending about surface 18. It is also to be noted that each lug 22 is angularly disposed relative to line 24 and the end of each lug 22 remote from line 24 is spaced inwardly of the corresponding edge 20.

Lugs 22 are adapted to penetrate the soil as tire 10 passes thereover and as tire 10 packs the soil in the region above the seed which has been previously planted by the machine upon which the tire is mounted. The boundaries between the depressions and the surface of the soil packed by surface 18 of tire 10 thus present lines or areas of weakness which give way as the plant or crop created as a result of the germination of the seed, passes upwardly and proceeds to emerge from the soil. Since the soil tends to crust after being packed down by surface 18, the lines of weakness formed by lugs 22 therefore, minimize the plant growth retardation normally caused by the crusting of the soil above the seed.

Figure 5:
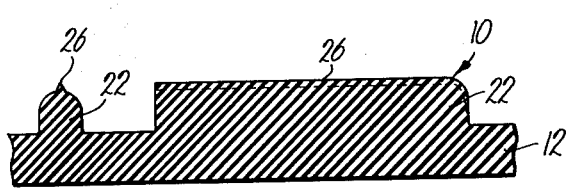
FIG. 5 is an enlarged, cross-sectional view taken along line 5—5 of FIG. 2.

Each lug 22 is provided with an elongated, outwardly projecting member 26 thereon extending along the length thereof as is clear in FIGS. 4 and 5. Members 26 penetrate the soil to form a secondary and additional depression which creates as a result, additional lines or areas of weakness in the soil above the seed. Members 26, therefore, further facilitate the emergence of the crop from the soil, notwithstanding the presence of crusted soil adjacent the depression formed by lugs 22.

It is to be noted that proximal ends of adjacent lugs 22 are transversely aligned with respect to the edges 20 so that the depressions are disposed substantially throughout the entire region of the soil above the seed below the surface of the ground. It is further to be noted that in the preferred embodiment of tire 10, the lugs 22 on one side of line 24, are substantially parallel with each other. Similarly, the lugs on the opposite side of line 24 are also parallel with each other.

Figure 7:
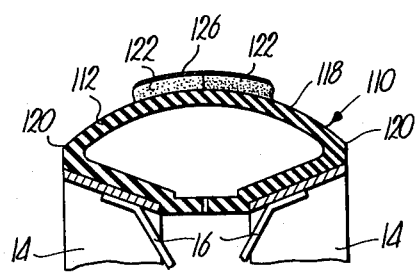
FIG. 7 is a cross-sectional view taken along line 7—7 of FIG. 6 and illustrating the manner in which the tire is mounted on a conventional press wheel.

In operation, tire 10 is disposed on a press wheel of the type illustrated in FIG. 7, with the surface 18 of tire 10 disposed for packing the soil above the seed planted by the machine of which the press wheel forms a part. Packing of the soil by tire 10 thus removes air pockets below the surface of the soil so that moisture is retained therewithin to enhance the germination of the seed in the soil.

Concurrently with the packing of the soil by surface 18, lugs 22 form depressions in the soil in the region thereof above the seeds so as to present lines or areas of weakness of the aforesaid character, and to provide pockets for receiving rainfall to reduce the effects of water erosion of the soil in the region above the seed.

Figure 6:
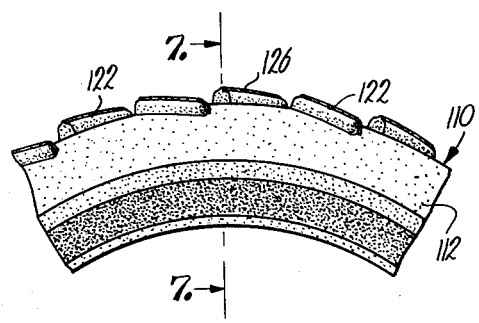
FIG. 6 is a fragmentary, side elevational view of a second embodiment of the tire forming the subject of the present invention and illustrating outwardly projecting lugs thereon.

A second embodiment of the tire is illustrated in FIGS. 6 and 7 and is broadly denoted by the numeral 110. Tire 110 is similar in all respects to tire 10 and includes a tubular body 112 and is adapted to be mounted on a press wheel of the same type on which tire 10 is mounted, such mounting of tire 110 on a press wheel being illustrated in FIG. 7.

Tire 110 is provided with a substantially convex, outermost peripheral surface 118 adapted to engage and pack the soil as the tire 110 passes thereover.

Tire 110 is provided with a series of circumferentially spaced, elongated lugs 122 thereon similar in all respects to lugs 22 except that the longitudinal axes of lugs 122 extend along arcuate lines complemental with the outer surface 118. Surface 118 is provided with a pair of spaced, circumferentially extending, marginal edges 120, and the edges of lugs 122 remote from the circumferentially extending center line of surface 118 are spaced from edges 120, as is clear in FIG. 7.

Each lug 122 is provided with an elongated member 126 integral therewith, members 126 being substantially identical in all respects to members 26.

In operation, tire 110 moves over the ground under the influence of the press wheel to which the same is attached so as to pack the soil in the region above the seed therewithin. Concurrently with the packing of the soil, lugs 122 and members 126 penetrate the soil to form depressions therewithin, the depressions formed by members 126 being shallower than and in communication with the depressions formed by lugs 122. The depressions thus formed in the soil present lines or areas of weakness above the seed which give way as the crop issuing from the seed passes upwardly through the soil toward the upper surface thereof. Although the packed soil may be crusted or hardened due to weather conditions, the lines or areas of weakness presented by the depressions, will permit the crop to emerge from the soil. It is thus evident that the yield of the crop from the soil is increased, owing to the fact that more plants may emerge from the soil in the presence of a crusted surface formed as a result of the packing of the soil by tire 110.

The depressions formed by lugs 122 and members 126 also retain water therewithin during normal rainfall to thereby reduce the effects of water erosion. Such depressions also tend to retard to some degree, erosion due to wind, especially when the depressions are substantially aligned in the direction of the wind.

If tire 110 is to be utilized with planting machines of the tool-bar type wherein the seed box on the machine is actuated by the press wheel, the proper actuation of the seed box is assured since lugs 122 provide sufficient traction for the press wheel at all times to thereby augment the motive force required to advance the machine in one direction over the ground.

Having thus described the invention, what is claimed as new and desired to be secured by Letters Patent is:

1. A tire for the press wheel of a seed planting machine, said tire comprising:

a tubular body of flexible material adapted to be mounted on said press wheel and to extend about the same, said body being provided with a soil-engaging, peripheral surface thereon disposed for packing the soil in the region above the seed after the latter has been planted; and a plurality of elongated, spaced, outwardly projecting bars integral with said peripheral surface and disposed for forming depressions and thereby areas of weakness in the soil at said region to facilitate the emergence of the crop formed by the seed therefrom, said peripheral surface having a pair of opposed, circumferentially extending marginal edges, said bars being angularly disposed relative to a circumferentially extending line midway between said edges with the inner ends of said bars being disposed substantially at said line and with the proximal ends of adjacent bars being substantially transversely aligned, each bar being provided with an elongated, outwardly projecting member thereon at the extremity thereof remote from said peripheral surface.

2. In combination:

a press wheel adapted to be rotatably mounted on a seed planting machine;

a tubular, semi-pneumatic body mounted on said press wheel and extending about the same for movement therewith, said body being provided with a soil-engaging peripheral surface thereon disposed for packing the soil in the region above the seed after the latter has been planted; and a plurality of spaced bars integral with said peripheral surface and projecting outwardly therefrom, said bars being disposed substantially circumferentially along said peripheral surface and being positioned for forming depressions in the soil at said region as the body moves under the influence of said press wheel, each bar being provided with an elongated, outwardly projecting member thereon at the extremity thereof remote from said peripheral surface, whereby areas of weakness are formed in the soil at said region to facilitate the emergence of the crop formed by the seed therefrom.

3. The combination as set forth in claim 2, wherein said peripheral surface is substantially flat.

4. The combination as set forth in claim 2, wherein said peripheral surface is substantially convex.

5. A tire for the press wheel of a seed planting machine, said tire comprising:

a tubular body adapted to be mounted on said press wheel and to extend about the same, said body being provided with a soil-engaging, peripheral surface thereon disposed for packing the soil in the region above the seed after the latter has been planted;

a plurality of bars integral with said peripheral surface and projecting outwardly therefrom, said body being formed of a flexible material, said bars being disposed substantially circumferentially along said peripheral surface and positioned for forming depressions in the soil at said region as the body moves under the influence of said press wheel, each of said bars having a generally convex outer, ground-engaging surface extending along the length thereof; and an elongated, outwardly projecting member on each bar respectively at the extremity thereof remote from said peripheral surface.

References Cited by the Examiner

UNITED STATES PATENTS

| | | | |
|---|---|---|---|
| 894,377 | 7/08 | Filler | 152—209 X |
| 1,460,247 | 6/23 | Johnson | 152—209 |
| 1,963,686 | 6/34 | Simpson | 172—540 |
| 2,534,675 | 12/50 | Miller | 172—519 X |
| 2,691,335 | 10/54 | Murray | 172—519 |
| 2,731,900 | 1/56 | Oehler | 172—519 X |
| 2,954,086 | 9/60 | Butman | 172—554 X |
| 3,074,455 | 1/63 | Richey | 152—352 |

SAMUEL KOREN, *Primary Examiner.*

A. JOSEPH GOLDBERG, *Examiner.*